US010018213B2

(12) United States Patent
Gstach et al.

(10) Patent No.: US 10,018,213 B2
(45) Date of Patent: Jul. 10, 2018

(54) EXPANSION ANCHOR HAVING A HIGH-STRENGTH EXPANSION SLEEVE IN CERTAIN AREAS

(71) Applicant: Hilti Aktiengesellschaft, Schaan (LI)

(72) Inventors: Peter Gstach, Schaan (LI); Bernhard Winkler, Feldkirch (AT); Robert Meier, Feldkirch-Gisingen (AT); Peter Rickers, Sax (CH); Patrick Scholz, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 107 days.

(21) Appl. No.: 15/030,455

(22) PCT Filed: Oct. 14, 2014

(86) PCT No.: PCT/EP2014/071952

§ 371 (c)(1),
(2) Date: Apr. 19, 2016

(87) PCT Pub. No.: WO2015/058996

PCT Pub. Date: Apr. 30, 2015

(65) Prior Publication Data

US 2016/0252120 A1 Sep. 1, 2016

(30) Foreign Application Priority Data

Oct. 21, 2013 (EP) .................................... 13189555

(51) Int. Cl.
*F16B 13/06* (2006.01)

(52) U.S. Cl.
CPC .......... *F16B 13/065* (2013.01); *F16B 13/066* (2013.01)

(58) Field of Classification Search
CPC ..... F16B 13/065; F16B 13/063; F16B 13/066
USPC ............................ 411/44, 57.1, 60.2, 63, 55
See application file for complete search history.

(56) References Cited

U.S. PATENT DOCUMENTS 3,200,692 A * 8/1965 Catlin ................. F16B 13/0858 411/30
4,100,834 A 7/1978 Harris
5,176,481 A 1/1993 Schiefer et al.
5,249,897 A * 10/1993 Gerhard ............... C21D 9/0093 411/50
5,419,664 A * 5/1995 Hengesbach ......... F16B 13/065 405/259.1
5,807,049 A * 9/1998 Beck ..................... F16B 13/004 411/31

(Continued)

FOREIGN PATENT DOCUMENTS

CN 102007308 4/2011
CN 102966650 3/2013
CN 202851555 4/2013

*Primary Examiner* — Flemming Saether

(74) *Attorney, Agent, or Firm* — Davidson, Davidson & Kappel, LLC

(57) ABSTRACT

An expansion anchor is provided having a stud and at least one expansion sleeve that surrounds the stud, whereby, on the stud, there is an expansion cone that radially widens the expansion sleeve when the expansion cone is pulled into the expansion sleeve. It is provided that the expansion sleeve has a hardness of more than 350 HV in the area of its front end facing the expansion cone, whereby the hardness of the expansion sleeve decreases towards its rear end. A production method for such an expansion anchor is also provided.

11 Claims, 2 Drawing Sheets

(56) References Cited

U.S. PATENT DOCUMENTS

| | | | | |
|---|---|---|---|---|
| 5,921,733 | A * | 7/1999 | Kaibach | F16B 13/0866 411/29 |
| 5,941,668 | A * | 8/1999 | Kaibach | F16B 13/065 411/30 |
| 6,213,697 | B1 * | 4/2001 | Uejima | F16B 13/004 411/30 |
| 7,744,320 | B2 | 6/2010 | Kobetsky et al. | |
| 8,678,730 | B2 * | 3/2014 | Gaudron | F16B 13/065 411/37 |
| 8,974,163 | B2 * | 3/2015 | Ricketts | F16B 13/063 411/45 |
| 2010/0135743 | A1 | 6/2010 | Gaudron et al. | |

* cited by examiner 28
27
20, 21
29
23
[HV]
500
400
300
200
100
500
350
300
200

12
20
100
1, 10
6
88
99
98

EXPANSION ANCHOR HAVING A HIGH-STRENGTH EXPANSION SLEEVE IN CERTAIN AREAS

The invention relates to an expansion anchor. Such an expansion anchor is configured with a stud and at least one expansion sleeve that surrounds the stud, whereby, on the stud, there is an expansion cone that radially widens the expansion sleeve and especially forces it radially outwards when the expansion cone is pulled into the expansion sleeve. The invention also relates to a production method for such an expansion anchor.

BACKGROUND

An expansion anchor of the generic type is known, for example, from U.S. Pat. Publ. No. 2010/0135743 A1. It is used to anchor objects to a hole drilled in a solid substrate, for example, in concrete. The prior-art expansion anchor has an elongated stud that is provided with an expansion cone in the area of its front end. The expansion cone widens towards its front end, that is to say, counter to the pull-out direction. An expansion sleeve is arranged on the stud in a way that is offset to the expansion cone in the pull-out direction. This expansion sleeve is supported on the stud so as to be movable on the expansion cone towards the front end of the stud. The expansion sleeve has elevations which protrude radially on the outside and with which the expansion sleeve can dig into the inner wall of the hole drilled in the substrate. With its first end facing forward, the expansion anchor is hammered into the drilled hole counter to the pull-out direction, and subsequently the stud is pulled somewhat out of the drilled hole in the pull-out direction. After the expansion anchor has been hammered in, the expansion sleeve digs into the inner wall of the drilled hole and is thus held back in the drilled hole when the stud is pulled out. In this manner, the expansion cone of the stud is pulled into the expansion sleeve, whereby the expansion sleeve is expanded due to the increasing diameter of the expansion cone. In this process, the expansion anchor is wedged with the expansion sleeve in the substrate so that tensile loads can be transmitted into the substrate. This basic principle can preferably be realized with the invention as well.

According to the above-mentioned U.S. Pat. Appln. No. 2010/0135743 A1, an expansion element made of a material having a Vickers hardness of between about 218 HV and 290 HV and a sleeve made of a material having a Vickers hardness of between about 218 HV and about 290 HV are provided.

SUMMARY OF THE INVENTION

It is an object of the present invention to provide a particularly reliable expansion anchor that has especially good load values and that is, at the same time, very simple to manufacture. Moreover, it is the objective to put forward a particularly simple, cost-effective and reliable production method for such an expansion anchor.

The present invention provides an expansion anchor having an expansion sleeve that has a Vickers hardness of more than 350 HV in the area of its front end facing the expansion cone, whereby the hardness of the expansion sleeve decreases towards its rear end. In particular, starting at 350 HV, the hardness of the expansion sleeve decreases towards the rear end of the expansion sleeve.

A basic idea of the invention can be seen in a special hardness curve in which the front area of the expansion sleeve—that is radially displaced by the expansion cone and pressed against the surrounding wall of the drilled hole when the expansion anchor is being installed—is high in strength, at least in certain areas, preferably continuously, that is to say, it has a hardness of more than 350 HV, and in which the rear area of the expansion sleeve is lower in strength. Experiments and simulations have shown that this yields an expansion anchor that has particularly good load properties, especially in cracked concrete, and that, at the same time, is very simple and cost-effective to produce.

In this context, the invention has recognized that the good load properties in cracked concrete can be due to the residual pre-tension that occurs in the stud of a pre-tensioned anchor after a crack in which the expansion anchor is situated has opened up somewhat, for example, by 0.3 mm to 0.5 mm. In the case of conventional expansion anchors with hardness values in the front sleeve area between 80 HV and 300 HV, a marked reduction of the pre-tensioning force, sometimes even as low as zero, has been observed in such a crack opening. In contrast, if a hardness of more than 350 HV according to the invention was selected for the front sleeve area, far higher residual pre-tension values could be observed. In turn, after such crack opening, these higher residual pre-tension values according to the invention can lead to better anchoring in the drilled hole, with the result that the expansion anchors according to the invention—in the case of crack opening and of a high tensile load—do not move as far into the drilled hole as expansion anchors that have less tip hardness on the expansion sleeve. In this manner according to the invention, very good load properties can be achieved in cracked concrete.

The invention has also recognized that the high residual pre-tension values and thus the better anchoring in cracked concrete and consequently the very good load properties of the expansion anchor according to the invention can be ascribed to the interaction of the front end area of the expansion sleeve with the surrounding concrete material. Once the anchor has been installed, this front end area is pressed by the expansion cone against the surrounding wall of the drilled hole. If, in accordance with the invention, a hardness of more than 350 HV, especially more than 400 HV, is selected for this front end area, then the sleeve material does not plasticize at all or at most only slightly under the boundary conditions that normally prevail in the construction sector, so that the expansion system is sturdier, especially if a crack opens and the contact surfaces between the expansion sleeve and the concrete are reduced in this process. This effect can lead to the observed marked improvement of the load properties.

Finally, the invention has recognized that, on the one hand, a high sleeve hardness of more than 350 HV can bring about the above-mentioned advantages in cracked concrete but that, on the other hand, the high sleeve hardness can also be disadvantageous, for example, in terms of the manufacture of the expansion sleeve and/or of the load properties of the anchor in other load situations. Thus, for example, a high sleeve hardness can make the conventional manufacturing process involving a bending step, especially a winding step, more difficult, thereby increasing the probability that out-of-round sleeve cross sections will be obtained which, in turn, can have a negative impact on the load properties. Moreover, a high sleeve hardness can potentially interfere with the expansion process of the expansion sleeve. Finally, a high sleeve hardness can also be associated with a greater tendency towards corrosion.

The invention solves this dilemma in that the high sleeve hardness is only provided in certain areas, namely, in the front sleeve area that is pressed against the surrounding wall of the drilled hole under the load exerted by the expansion cone, where the high sleeve hardness can thus bring about the above-mentioned advantages in terms of the load properties in cracked concrete. In contrast, according to the invention, further back along the expansion sleeve, a lower hardness is provided in the rear sleeve area. Owing to this lower hardness that is provided in the rear sleeve area, for one thing, the expansion sleeve can expand very simply and reliably. Moreover, a particularly simple production by bending a sheet metal to form the expansion sleeve is possible, even if the greater hardness is already present in certain areas before this bending step is carried out. Subsequent inductive hardening is also very easy to implement. Finally, the corrosion properties can also be markedly improved since the areas of the expansion sleeve facing the opening of the drilled hole are soft. Here, as a rule, the low strength in the rear area does not have a detrimental effect on the load properties in cracked concrete since the above-mentioned mechanism only takes place at the front end of the sleeve. Consequently, according to the invention, an expansion anchor can be obtained that, in numerous different situations, can be produced very reliably and simply so as to have an excellent performance.

The term hardness expressed in HV is normally used in technical circles to refer to the Vickers hardness. According to the invention, the hardness refers especially to the surface hardness of an intact expansion sleeve. In particular, the hardness values according to the invention can be present in the non-expanded sleeve, in other words, in an expansion anchor in its initial condition, in which the expansion cone has not yet been pulled into the expansion sleeve. The high-strength area where the hardness is more than 350 HV can preferably extend annularly around the entire circumference of the expansion sleeve, at most being interrupted by expansion slits that might be present. The high-strength area, however, can also be smaller and can cover only portions of the circumference of the expansion sleeve. It is also possible for several separate high-strength areas to be provided at the front of the expansion sleeve. The rear end of the expansion sleeve, towards which the hardness of the expansion sleeve decreases according to the invention, is axially opposite from the front end and/or faces away from the expansion cone.

According to the invention, the expansion sleeve is arranged, especially attached, so as to be movable lengthwise along the stud. Whenever the terms “radial”, “axial” and “circumferential direction” are used, this can refer especially to the longitudinal axis of the stud, which can especially be the symmetrical and/or center axis of the stud. The expansion anchor can preferably be a force-controlled expanding expansion anchor. The expansion sleeve and/or the stud are advantageously made of a metal material that can also be coated, for example, in order to systematically influence the friction. The high hardness in the front area of the expansion sleeve can be achieved, for example, by rolling and/or by inductive hardening. Preferably, the expansion sleeve can be made of stainless steel, especially of type 1.4401 and/or A4 and/or of type 1.4301 and/or A2. In this case, the high hardness in the front area of the expansion sleeve can preferably be achieved by rolling. If, as an alternative, a CS steel is used to make the expansion sleeve, the high hardness in the front area can be achieved, for example, by inductive hardening.

According to the invention, the expansion sleeve is forced radially outwards by the slanted surface of the expansion cone and is thus pressed against the wall of the hole drilled in the substrate when the expansion cone is moved axially relative to the expansion sleeve in the pull-out direction of the stud. In this manner, the expansion anchor becomes anchored in the drilled hole. Preferably, the pull-out direction runs parallel to the longitudinal axis of the stud and/or it faces out of the drilled hole. Advantageously, the distance between the surface of the expansion cone and the longitudinal axis of the stud increases counter to the pull-out direction, that is to say, as the distance from the load absorption means increases. The surface of the expansion cone can be strictly conical but it does not have to be.

In a so-called stud anchor, the expansion cone can be axially attached to the stud. The expansion cone is then pulled into the expansion sleeve by a joint axial movement of the stud and of the expansion cone relative to the expansion sleeve. In this context, the expansion cone is preferably configured in one piece with the stud. As an alternative, in the case of a so-called sleeve anchor, the expansion cone can be a part that is separate from the stud and can preferably be connected to the stud by means of matching threads. The expansion cone into the expansion sleeve can then preferably be pulled, at least partially, by a rotation of the stud relative to the expansion cone, said pulling movement being converted into an axial movement of the expansion cone relative to the stud by a spindle drive made up of the matching threads.

Preferably, the expansion sleeve has at least two expansion segments that are connected to each other by a web. In particular, it can then be provided that at least one of the expansion segments has a hardness more than 350 HV in the area of its front end, whereby the hardness of the expansion segment decreases in the direction of the rear end of the expansion segment. The expansion sleeve can also have three or more expansion segments. The expansion anchor can also have more than one expansion sleeve and accordingly more than one expansion cone.

It is especially preferred for the expansion sleeve to have a hardness of more than 350 HV and less than 500 HV in the area of its front end facing the expansion cone. This embodiment takes into consideration the fact that the sleeve material becomes very brittle at hardness values above 500 HV, and that then a satisfactory expansion of the expansion sleeve can often no longer be achieved.

Advantageously, it can be provided that the expansion sleeve has a hardness of less than 340 HV, preferably less than 300 HV, in at least one rear area. As already explained above, owing to a relatively low hardness in the rear area, among other things, a very simple and reliable assembly of the expansion sleeve around the stud is made possible and a very good expansion behavior is achieved, in addition to which the corrosion properties can be especially advantageous. Said rear area, which has a hardness of less than 340 HV or 300 HV, can preferably be further away from the expansion cone than the front area in which the hardness is more than 350 HV. Preferably, said rear area, which has a hardness of less than 340 HV or 300 HV, can overlap axially with a web of the expansion sleeve, that is to say, it can be situated, at least in certain areas, in the so-called connection area that serves to attach the expansion sleeve to the stud. In this connection area, a hardness of less than 340 HV, especially less than 300 HV, can be advantageous since this area is often severely deformed when the expansion sleeve is being wound around the stud. Advantageously, the expansion sleeve can have a hardness of less than 340 HV, especially less than 300 HV at the web. The web described in this paragraph can be especially a web that joins the two expansion segments.

Since the contact between the expansion sleeve and the wall of the drilled hole is often only established in the front 3 mm to 5 mm of the expansion sleeve when the expansion anchor is in its expanded state, the front area in which the hardness is more than 350 HV can preferably have a length in the axial direction of less than 10 mm.

Moreover, it is advantageous for the wall thickness of the expansion sleeve to decrease, at least in certain areas, towards its front end. In this manner, the expansion behavior can be improved even further. Preferably, the expansion sleeve has a tapered area in which the wall thickness of the expansion sleeve decreases towards its front end, and an adjoining rear end area with an essentially constant wall thickness, whereby advantageously, the hardness in the tapered area, at least in certain areas, is more than 350 HV and/or the hardness in the area with the essentially constant wall thickness, at least in certain areas, is less than 340 HV, especially less than 300 HV. This is particularly advantageous from the vantage point of production since the reduced wall thickness and the greater hardness in the tapered area can be created at the same time in one rolling step.

In particular, it can be provided for the expansion sleeve to have at least one expansion slit. The expansion slit can separate two adjacent expansion segments and/or the web can be formed in the axial extension of the expansion slit. The expansion slit starts at the front end of the expansion sleeve and can facilitate the deformation of the expansion sleeve.

According to the invention, the stud can have a load absorption means that can especially be configured as an external thread or as an internal thread. The load absorption means serves to introduce tensile forces that are directed into the studs in the pull-out direction. Advantageously, the expansion cone is arranged in a first end area of the stud and the load absorption means is arranged in an opposite second end area of the stud. In particular, the direction vector of the pull-out direction can be oriented from the expansion cone towards the load absorption means.

Preferably, the invention can be used for stud anchors in which the expansion sleeve does not extend all the way to the opening of the drilled hole. Particularly in this case, the stud can have a stop that limits a movement of the expansion sleeve away from the expansion cone, that is to say, a movement in the pull-out direction. Such a stop can very simply ensure that the expansion sleeve reliably enters the drilled hole together with the stud. Preferably, the stop is a ring shoulder, which can be advantageous from a production standpoint and with an eye towards reliability. In particular, the stop is arranged axially between the expansion cone and the load absorption means.

The invention also relates to a production method which yields the expansion anchor according to the invention. With this method, the hardness of more than 350 HV is created in the area of the front end of the expansion sleeve in a rolling step. Through the use of such a rolling step, the tapered area of the expansion sleeve and the hardness of more than 350 HV can be produced at the same time. In particular, it can be provided that, in the rolling step, a rolling tool is used whose axis of rotation runs parallel to the at least one expansion slit and/or to the later longitudinal axis of the expansion anchor and/or to the later longitudinal axis of the expansion sleeve.

BRIEF DESCRIPTION OF THE DRAWINGS

The invention will be explained in greater detail below on the basis of preferred embodiments that are schematically shown in the accompanying figures, whereby individual features of the embodiments shown below can be implemented within the scope of the invention, either on their own or in any desired combination. The figures schematically show the following.

DETAILED DESCRIPTION

Figure 1:
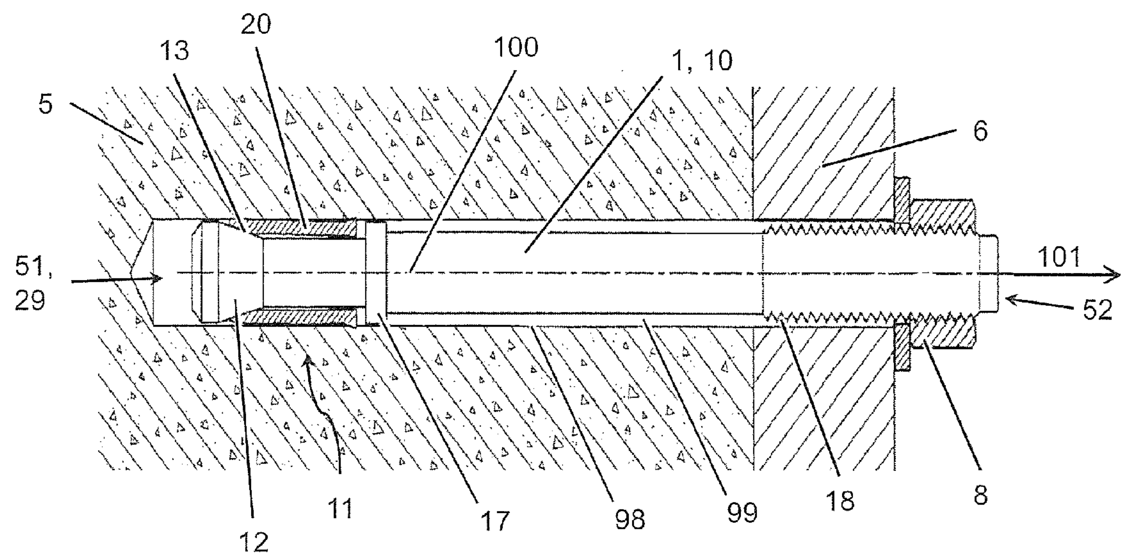
FIG. 1 a partial lengthwise sectional view of an expansion anchor according to the invention after it has been installed in a concrete substrate.
Figure 2:
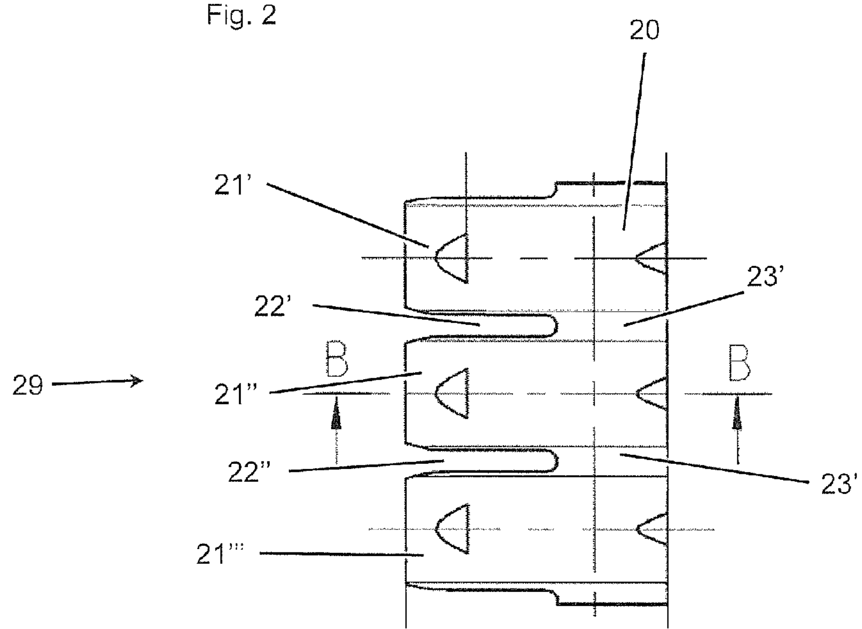
FIG. 2 a developed view of the outside of the expansion sleeve of the anchor of FIG. 1.
Figure 3:
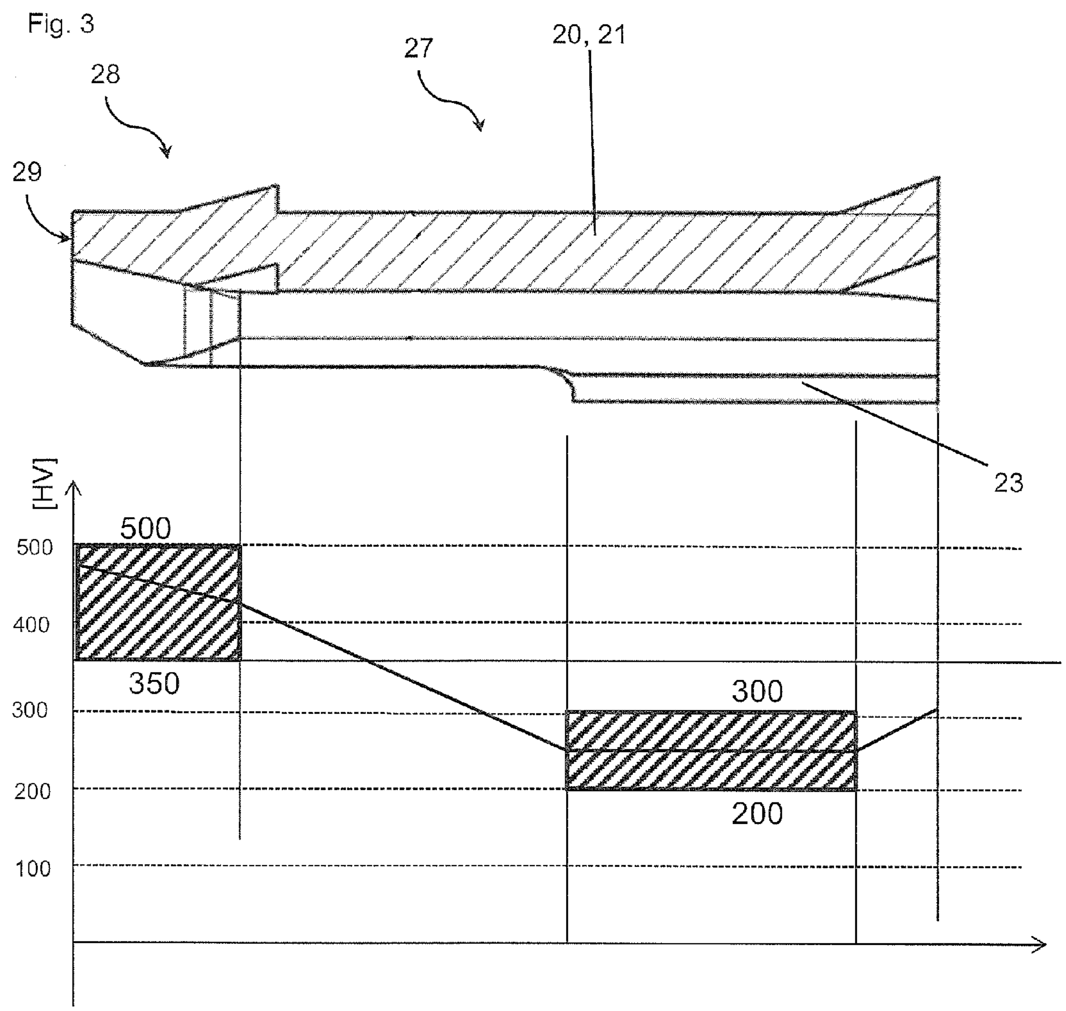
FIG. 3 a lengthwise sectional view B-B through the expansion sleeve of FIG. 2 and, below it, the hardness curve along the section.

FIGS. 1 to 3 show an embodiment of an expansion anchor 1 according to the invention. As can especially be seen in FIG. 1, the expansion anchor 1 has a stud 10 and an expansion sleeve 20, whereby the expansion sleeve 20 annularly surrounds the stud 10. In the area of its front end 51, the stud 10 has an expansion cone 12 for the expansion sleeve 20 which is always followed on the rear by a neck area 11.

In the neck area 11, the stud 10 has an essentially constant cylindrical cross section. On the adjoining expansion cone 12, the surface of the stud 10 is configured as a slanted surface 13, and the diameter of the stud 10 increases there towards the first end 51, that is to say, starting from the neck area 11, the stud 10 widens on the expansion cone 12 towards the front first end 51. The slanted surface 13 on the expansion cone 12 can be conical in the strict mathematical sense, but it does not have to be.

On the side of the neck area 11 facing away from the expansion cone 12, the stud 10 has a stop 17 configured, for instance, as a ring shoulder, for the expansion sleeve 20. In the area of its rear end 52, the stud has a load absorption means 18 for introducing tensile forces into the stud 10, whereby said load absorption means 18 is configured here, by way of example, as an external thread. A nut 8 is situated on this external thread.

When the expansion anchor 1 is installed, the stud 10 is pushed with its first end 51 facing forward in the direction of the longitudinal axis of said stud 10 into a drilled hole 99 in the substrate 5 of FIG. 1. Owing to the stop 17, which limits a movement of the expansion sleeve 20 away from the expansion cone 12, the expansion sleeve 20 is also inserted into the drilled hole 99. Then, for example, by tightening the nut 8, the stud 10 is once again pulled somewhat out of the drilled hole 99 in the pull-out direction 101 that runs parallel to the longitudinal axis 100. The expansion sleeve 20 is left behind in the drilled hole 99 due to its friction against the essentially cylindrical wall 98 of the drilled hole 99, as a result of which the stud 10 moves relative to the expansion sleeve 20. During this movement, the slanted surface 13 of the expansion cone 12 of the stud 10 penetrates ever-deeper into the expansion sleeve 20 in such a way that the expansion sleeve 20 is radially widened in the area of its front end 29 by the slanted surface 13, and it is pressed against the wall 98 of the drilled hole 99. Owing to this mechanism, the expansion anchor 1 is affixed in the substrate 5. The installed state of the expansion anchor 1, in which it is affixed in the substrate 5, is shown in FIG. 1. The nut 8 can be used to secure a structural part 6 to the substrate 5.

As can be seen especially in FIG. 2, the expansion sleeve 20 has three expansion segments 21', 21", 21'", whereby adjacent expansion segments 21 are partially separated from each other by expansion slits 22', 22". The expansion slits 22 start from the front end 29, that is to say, from the end face of the expansion sleeve 20 that faces the expansion cone 12. In the extension of the expansion slits 22', 22", a web 23' or 23" is formed, whereby the webs 23 each connect two adjacent expansion segments 21 to each other.

As especially shown in FIG. 3, the expansion segments 21 of the expansion sleeve 20, especially in a lengthwise sectional view, each have an area 27 with an essentially constant wall thickness. This area 27, with its essentially constant wall thickness, is adjoined on the front, especially in the lengthwise section, by a tapered area 28 in which the wall thickness of the expansion segment 21 decreases towards the front end 29.

As FIG. 3 also shows, the hardness of at least one of the expansion segments 21 in its rear area 27 having an essentially constant wall thickness at least in certain areas, especially in the axial direction at the height of the web 23, is below 340 HV and preferably below 300 HV. Preferably, the hardness there is between 200 HV and 300 HV, especially approximately 250 HV. From there, the hardness increases towards the front end 29 of the expansion segment 21 and, in the tapered segment 28, it reaches a hardness of more than 350 HV, especially between 350 HV and 500 HV, especially in the front 3 mm to 5 mm of the expansion segment 21.

Figure 4:
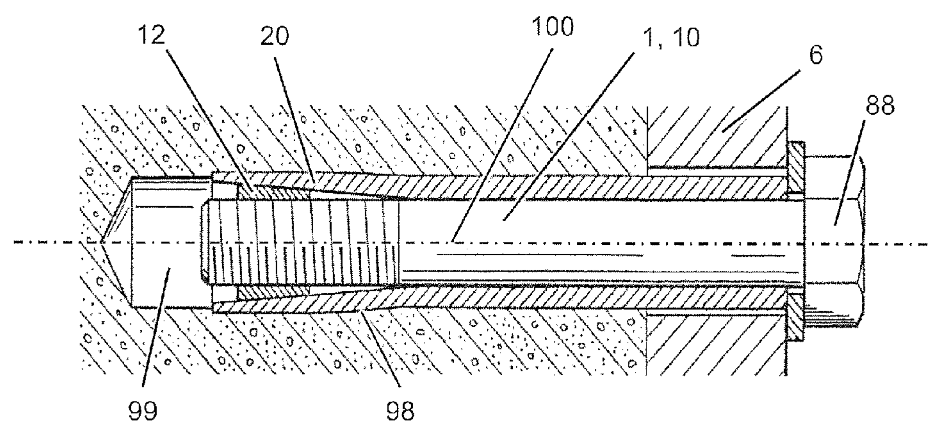
FIG. 4 a partial lengthwise sectional view of an expansion anchor according to the invention after it has been installed in a concrete substrate, in a second embodiment.

In the embodiment of FIG. 1, the expansion anchor 1 is configured as a so-called stud anchor. Another embodiment in which the expansion anchor 1 is configured as a so-called sleeve anchor, is shown in FIG. 4. In contrast to the stud anchor of FIG. 1, in which the expansion cone 12 is permanently attached axially to the stud 10 and especially is configured in one piece with the stud 10, the expansion cone 12 is a part that is separate from the stud 10 in the sleeve anchor of FIG. 4. It has an internal thread that matches an external thread on the stud 10. Moreover, in the case of the sleeve anchor of FIG. 4, the expansion sleeve 20, which can also have a multi-part design, extends to the opening of the drilled hole, and a widened head 88 is non-rotatably arranged at the rear end of the stud 10.

In order to install the anchor of FIG. 4, the stud 10 is made to rotate around the longitudinal axis 100 by the head 88. The matching threads convert this rotational movement of the stud 10 into an axial movement of the expansion cone 12 relative to the stud 10 and then relative to the expansion sleeve 20, which causes the expansion cone 12 to be pulled into the expansion sleeve 20.

According to the invention, the hardness profile of the expansion sleeve 20 of the sleeve anchor of FIG. 4 is configured in accordance with FIG. 3, whereby in the case of the sleeve anchor of FIG. 4, the low-strength rear area 27 with its essentially constant wall thickness is generally axially longer than shown in FIG. 3.

The invention claimed is:

1. An expansion anchor comprising:
a stud; and
an expansion sleeve surrounding the stud;
an expansion cone on the stud radially widening the expansion sleeve when the expansion cone is pulled into the expansion sleeve,
the expansion sleeve having a hardness of more than 350 HV and less than 500 HV in an area of a front end facing the expansion cone, the hardness of the expansion sleeve decreasing towards a rear end.

2. The expansion anchor as recited in claim 1 wherein in at least one rear area the expansion sleeve has a hardness of less than 340 HV.

3. The expansion anchor as recited in claim 2 wherein in the at least one rear area the expansion sleeve has a hardness of less than 300 HV.

4. The expansion anchor as recited in claim 2 wherein the at least one rear area overlaps axially with a web of the expansion sleeve.

5. The expansion anchor as recited in claim 2 wherein a wall thickness of the expansion sleeve decreases, at least in certain areas, towards the front end.

6. The expansion anchor as recited in claim 2 wherein the expansion sleeve has at least one expansion slit.

7. The expansion anchor as recited in claim 2 wherein the stud has a load absorber for introducing tensile forces into the stud.

8. The expansion anchor as recited in claim 7 wherein the load absorber is a thread.

9. The expansion anchor as recited in claim 2 wherein the stud has a stop limiting a movement of the expansion sleeve away from the expansion cone.

10. The expansion anchor as recited in claim 9 wherein the stop is a ring shoulder.

11. A production method for producing the expansion anchor as recited in claim 2, the method comprising: creating the hardness of more than 350 HV in the area of the front end of the expansion sleeve in a rolling step.

* * * * *